US007940268B2

(12) United States Patent
Zhou et al.

(10) Patent No.: US 7,940,268 B2
(45) Date of Patent: *May 10, 2011

(54) REAL-TIME RENDERING OF LIGHT-SCATTERING MEDIA

(75) Inventors: Kun Zhou, Beijing (CN); Qiming Hou, Hebei (CN); Minmin Gong, Beijing (CN); John Michael Snyder, Redmond, WA (US); Baining Guo, Beijing (CN); Heung-Yeung Shum, Beijing (CN)

(73) Assignee: Microsoft Corporation, Redmond, WA (US)

( * ) Notice: Subject to any disclaimer, the term of this patent is extended or adjusted under 35 U.S.C. 154(b) by 897 days.

This patent is subject to a terminal disclaimer.

(21) Appl. No.: 11/770,942

(22) Filed: Jun. 29, 2007

(65) Prior Publication Data

US 2009/0006051 A1    Jan. 1, 2009

(51) Int. Cl.
*G06T 15/50* (2011.01)
*G06T 15/00* (2011.01)

(52) U.S. Cl. .......................... 345/426; 345/419

(58) Field of Classification Search .................. None
See application file for complete search history.

(56) References Cited

U.S. PATENT DOCUMENTS

| | | | |
|---|---|---|---|
| 5,412,796 A | 5/1995 | Olive | |
| 5,696,892 A | 12/1997 | Redmann et al. | |
| 5,742,749 A | 4/1998 | Foran et al. | |
| 5,754,185 A | 5/1998 | Hsiao et al. | |
| 5,884,226 A | 3/1999 | Anderson et al. | |
| 5,990,903 A * | 11/1999 | Donovan | 345/589 |
| 6,064,392 A | 5/2000 | Rohner | |
| 6,184,857 B1 | 2/2001 | Latham | |
| 6,256,038 B1 | 7/2001 | Krishnamurthy | |
| 6,268,861 B1 | 7/2001 | Sanz-Pastor et al. | |
| 6,271,856 B1 | 8/2001 | Krishnamurthy | |
| 6,437,781 B1 | 8/2002 | Tucker et al. | |
| 6,529,194 B1 | 3/2003 | Yamaguchi | |

(Continued)

FOREIGN PATENT DOCUMENTS

EP    1347419(A2)    9/2003

(Continued)

OTHER PUBLICATIONS

Pighin, F., Cohen, J. M., and Shah, M. 2004. Modeling and editing flows using advected radial basis functions. In Proceedings of the 2004 ACM Siggraph/Eurographics Symposium on Computer Animation (Grenoble, France, Aug. 27-29, 2004). Symposium on Computer Animation. Eurographics Association, Aire-la-Ville, Switzerland, 223-232.*

(Continued)

*Primary Examiner* — Daniel F Hajnik
(74) *Attorney, Agent, or Firm* — Lee & Hayes, PLLC

(57) ABSTRACT

A real-time algorithm for rendering an inhomogeneous scattering medium such as fog is described. An input media animation is represented as a sequence of density fields, each of which is decomposed into a weighted sum of a set of radial basis functions (RBFs) such as Gaussians. The algorithm computes airlight and surface reflectance of the inhomogeneous scattering medium. Several approximations are taken which lead to analytical solutions of quantities such as an optical depth integrations and single scattering integrations, and a reduced number of integrations that need to be calculated. The resultant algorithm is able to render inhomogeneous media including their shadowing and scattering effects in real time. The algorithm may be adopted for a variety of light sources including point lights and environmental lights.

19 Claims, 7 Drawing Sheets

U.S. PATENT DOCUMENTS

| | | | |
|---|---|---|---|
| 6,556,197 | B1 | 4/2003 | Van Hook et al. |
| 6,567,083 | B1 | 5/2003 | Baum et al. |
| 6,580,430 | B1 | 6/2003 | Hollis et al. |
| 6,580,936 | B2 | 6/2003 | Muraki et al. |
| 6,686,915 | B2 | 2/2004 | Andrews |
| 6,762,760 | B2 | 7/2004 | Deering |
| 6,799,141 | B1 | 9/2004 | Stoustrup et al. |
| 6,825,840 | B2 | 11/2004 | Gritz |
| 6,897,878 | B2 | 5/2005 | Cosman et al. |
| 6,956,576 | B1 | 10/2005 | Deering et al. |
| 6,989,831 | B2 | 1/2006 | Ebersole et al. |
| 7,046,243 | B1 | 5/2006 | Mech |
| 7,133,041 | B2 | 11/2006 | Kaufman et al. |
| 7,184,043 | B2 | 2/2007 | Anderson et al. |
| 7,184,051 | B1 | 2/2007 | Matsumoto et al. |
| 7,242,401 | B2 | 7/2007 | Yang et al. |
| 7,245,301 | B2 * | 7/2007 | Mech .................. 345/426 |
| 7,262,770 | B2 | 8/2007 | Sloan et al. |
| 7,348,977 | B2 * | 3/2008 | West et al. .................. 345/426 |
| 7,538,764 | B2 | 5/2009 | Salomie |
| 7,602,398 | B2 | 10/2009 | Zhou et al. |
| 2001/0030648 | A1 * | 10/2001 | Deering ........................ 345/426 |
| 2005/0275626 | A1 | 12/2005 | Mueller et al. |
| 2006/0028468 | A1 | 2/2006 | Chen et al. |
| 2006/0176303 | A1 | 8/2006 | Fairclough |

FOREIGN PATENT DOCUMENTS

| | | |
|---|---|---|
| JP | 2002216158(A) | 8/2002 |
| JP | 2003296750(A) | 10/2003 |
| JP | 2005135052(A) | 5/2005 |
| JP | 2005346165(A) | 12/2005 |
| JP | 2006318389(A) | 11/2006 |

OTHER PUBLICATIONS

Blinn, "Light Reflection Functions for Simulation of Clouds and Dusty Surfaces," In Proceedings of SIGGRAPH 82, vol. 16, No. 3, Jul. 1982, pp. 21-29.

Cerezo et al, "A Survey on Participating Media Rendering Techniques," The Visual Computer vol. 21, No. 5, 2005, 24 pgs.

Harris, et al., "Real-Time Cloud Rendering", at <<http://www.cs.unc.edu/Research/nano/documentarchive/publications/2001Harris%20RTClouds_EG2001.pdf>>, Eurographics, vol. 20, No. 3, 2001, 9 pgs.

Harris, "Real-Time Cloud Simulation and Rendering," dissertation available at <<http://www.markmark.net/dissertation/harrisDissertation.pdf>>, University of North Carolina at Chapel Hill, 2003, 173 pgs.

Harris, "Real-Time Cloud Rendering for Games", at <<http://charm.cs.uiuc.edu/users/olawlor/academic/thesis/ref/RTCloudsForGames_HarrisGDC2002.pdf>>, Appears in Game Developers Conference, 2002, pp. 1-14.

Hege et al, "Volume Rendering Mathematical Models and Algorithmic Aspects," available at <<http://www.cs.ucsb.edu/~holl/pubs/hege-1993-vrm.pdf>>, Technical report, Konrad-Zuse-Zentrum fur Informationstechnik Berlin (ZIB), TR 93-7, 1993, Berlin, Germany, pp. 1-36.

Man, "Generating and Real-Time Rendering of Clouds", available at least as early as Aug. 31, 2007, at <<http://www.cescg.org/CESCG-2006/papers/Prague-Man-Petr.pdf>>, Czech Technical University in Prague, Czech Republic, 2006, 8 pgs.

McGuire, et al., "Real-Time Rendering of Cartoon Smoke and Clouds", available at least as early as Apr. 24, 2007, at <<http://delivery.acm.org/10.1145/1130000/1124733/p21-mcguire.pdf?key1=1124733&key2=2871847711&coll=GUIDE&dl=GUIDE&CFID=17296249&CFTOKEN=96392500>>, ACM, 2006, pp. 21-26.

Nealen, et al., "Physically Based Deformable Models in Computer Graphics", retrieved on Apr. 26, 2007, at <<http://www.blackwell-synergy.com/doi/abs/10.1111/j.1467-8659.2006.01000.x>>, Blackwell Synergy, vol. 25, No. 4, Dec. 2006, pp. 1-24.

Ng et al, "Triple Product Wavelet Integrals for All-Frequency Relighting," ACM Transactions on Graphics, vol. 23, No. 3, Jul. 2004, 477-487.

O'Rourke, "Computational Geometry in C," Second Edition. Cambridge University Press, Cambridge, England, 1998, book overview retrieved at <<http://maven.smith.edu/~orourke/books/compgeom.html>> and <<http://maven.smith.edu/~orourke/books/cgc-dtoc.html>>, 9 pgs.

Premoze, et al., "Practical Rendering of Multiple Scattering Effects in Participating Media", at <<http://www.cs.columbia.edu/cg/pdfs/50_HRPIEG.pdf>>, The Eurographics Symposium on Rendering, 2004, 12 pgs.

Reeves, "Particle Systems—A Technique for Modeling a Class of Fuzzy Objects," Computer Graphics, vol. 17, No. 3, Jul. 1983, pp. 359-375.

Sloan et al, "Precomputed Radiance Transfer for Real-Time Rendering in Dynamic, Low-Frequency Lighting Environments," ACM Transactions on Graphics, 2002, 527-536.

Snyder, "Code Generation and Factoring for Fast Evaluation of Low-Order Spherical Harmonic Products and Squares," Tech. Rep.MSR-TR-2006-53, Microsoft Corporation, Feb. 2006, 9 pgs.

Sun et al, "A Practical Analytic Single Scattering Model for Real Time Rendering," ACM Transactions on Graphics, Aug. 2005, 1040-1049.

Venceslas, et al., "Real Time Rendering of Atmospheric Scattering and Volumetric Shadows", UNION Agency-Science Press, vol. 14, Jan. 30-Feb. 3, 2006, 8 pgs.

Zhou et al, "Fogshop: Real-Time Design and Rendering of Inhomogeneous, Single-Scattering Media," available at <<http://research.microsoft.com/users/kunzhou/publications/MSR-TR-2007-37.pdf>>, Microsoft Research MSR-TR-2007-37, Mar. 2007, 9 pgs.

Zhou, et al., "Real-Time Smoke Rendering Using Compensated Ray Marching", at <<http://research.microsoft.com/research/pubs/view.aspx?tr_id=1385>>, Sep. 2007, 11 pgs.

Hegeman et al., "A Lighting Model for General Participating Media", 2005 Association for Computing Machinery, Inc., 9 pages.

Jensen et al., "A Practical Model for Subsurface Light Transport", ACM Siggraph 2001, Aug. 2001, Los Angeles, CA, 8 pages.

Juba et al., "Modeling and Rendering Large Volume Data with Gaussian Radial Basis Function", University of Maryland, Apr. 2007, 16 pages.

Riley et al., "Efficient Rendering of Atmospheric Phenomena", Eurographice Symposium on Rendering 2004, pp. 1-12.

* cited by examiner

EXEMPLARY ALGORITHM FOR ACCUMULATING AIRLIGHT $(L_a, T) \leftarrow (0,0)$

For each pixel $T \mathrel{+}= \beta_0\, d_{vp}$

For each point light source

Compute the homogeneous term of airlight, $L_0$, via eq. (17)

$L_a \mathrel{+}= L_0$

For each Gaussian $i$

For each pixel covered by its bounding box

Compute line integral along view ray, $T_i(v, p)$, via eq. (11a)

$L_i \leftarrow 0$

For each point light source $L_i \mathrel{+}= f^0(b_i^r)\, f^1(b_i)\, T_i(v, p)$ $(L_a, T) \mathrel{+}= (L_i, T_i)$ // accumulate to airlight target For each pixel covered by the environment map $L_a \mathrel{+}= (L^{\text{in}} * \text{NPSF})(\hat{r})\, T \exp(-T)$

Fig. 7

REAL-TIME RENDERING OF LIGHT-SCATTERING MEDIA

BACKGROUND

Computer graphics systems are used in many game and simulation applications to create atmospheric effects such as fog, smoke, clouds, smog and other gaseous phenomena. These atmospheric effects are useful because they create a more realistic sense of the environment and also create the effect of objects appearing and fading at a distance.

An algorithm capable of rendering realistic images of these atmospheric effects needs to take into consideration the light scattering. Scattering due to light transport in air or water is the source of many important visual effects which determine appearance of the directly-viewed media as well as the surfaces immersed within it. Such effects are critical for realism. One example of the scattering effects is shadowing of the scattering medium. Without self-shadowing, for example, dense media such as clouds or smoke appear to emit rather than just reflect light, producing an overall implausible and cartoon-like effect. Another example of the scattering effects is haloing which creates bright regions around lights. Scattering also substantially softens the shading on immersed surfaces.

In real-time applications such as 3D games, these scattering effects have been either completely neglected or approximated using restrictive models which assume the medium is entirely homogeneous or trivially layered. Such models exclude inhomogeneous media such as non-constant fog, more complex clouds and smoke whose optical density varies greatly over space and time.

Some volume-rendering approaches simulates source radiance within the volume of the inhomogeneous medium and also support attenuation through medium by accumulating optical density in depth-sorted order over the discretized volume, but neglect scattering/shadowing effects. Full Monte Carlo scattering simulation may yield an accurate rendering, but is far too expensive for the real-time demands of designers and end-users.

Despite the practical difficulties of rendering inhomogeneous light scattering media (e.g., fog), such rendering nevertheless remains a popular element in many applications such as films and games. From an end user's point of view, what is needed is an ability to render in real-time complex scenes with high quality visual realism. From a designer's point of view, what is needed is affordable real-time or close to real-time control over the lighting environment and vantage point, as well as the density distribution and optical properties of the medium.

SUMMARY

A real-time algorithm for rendering of an inhomogeneous scattering medium such as fog is described. An input media animation is represented as a sequence of density fields, each of which is decomposed into a weighted sum of a set of radial basis functions (RBFs) such as Gaussians. Algorithms of calculating airlight and surface reflectance of the inhomogeneous scattering medium are introduced. Approximations are taken which lead to analytical solutions of quantities such as optical depth integrations and single scattering integrations, and fewer integrations calculated. The resultant rendering scheme is able to render inhomogeneous media including their shadowing and scattering effects in real time. The algorithms may be adopted for a variety of light sources including point lights and environmental lights.

In one embodiment, analytic approximation to the airlight integral is introduced. For each Gaussian, this approximation samples the scattering integrand at the projection of the Gaussian center onto the view ray, but models attenuation and shadowing with respect to the other Gaussians by integrating density along the fixed path from the light source to the Gaussian center and to the view point. In some embodiments, the algorithms also generalize models for reflectance of surfaces from constant-density to inhomogeneous media, using simple optical depth averaging in the direction of the light source or all around the receiver point.

The algorithms handle isotropic, single-scattering media illuminated by point light sources or low-frequency environmental lighting. The real-time rendering algorithm may be incorporated into a system for real-time design and preview of realistic, animated fog, steam, or smoke.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE FIGURES

The detailed description is described with reference to the accompanying figures. In the figures, the left-most digit(s) of a reference number identifies the figure in which the reference number first appears. The use of the same reference numbers in different figures indicates similar or identical items.

FIG. 7 shows an exemplary algorithm for accumulating airlight.

DETAILED DESCRIPTION

Overview

The algorithms described herein may be generalized to be applicable to a variety of light sources, including point light and environment light, and is capable of simulating scattering effects such as shadowing and haloing which other methods either ignore or takes a significant amount of commutation to render. Novel approximations are part of the algorithms described herein that make real-time rendering possible. In some embodiments, the algorithms relate to a screen-space rendering method, in contrast to volume rendering methods. In these embodiments, single scattering is considered without considering the source radiance within the volume.

The algorithms described herein include two major aspects. The first aspect counts for airlight of an inhomogeneous scattering medium. The second aspect counts for surface reflectance of an object (surface) placed in the inhomogeneous medium. The airlight relates to the appearance of the scattering medium illuminated by one or more light sources, such as a point light source and an environment lighting. The surface reflectance relates to the light reflected by a surface of an object into the scattering medium in which the object is immersed. When the scattering medium is viewed alone, its appearance is largely determined by the airlight. When the scattering medium is viewed along with an object immersed therein from a view ray which intersects with a surface of the object, the appearance of the scattering medium and the object are affected by both the airlight and the surface reflectance. Depending on the configuration of the scene (the scattering medium and/or objects), the algorithms for airlight and the surface reflectance may either be applied separately or in combination to render the scene.

Exemplary processes for rendering an inhomogeneous scattering medium are illustrated with reference to FIGS. 1-2. The order in which the processes described is not intended to be construed as a limitation, and any number of the described method blocks may be combined in any order to implement the method, or an alternate method.

Airlight

Figure 1:
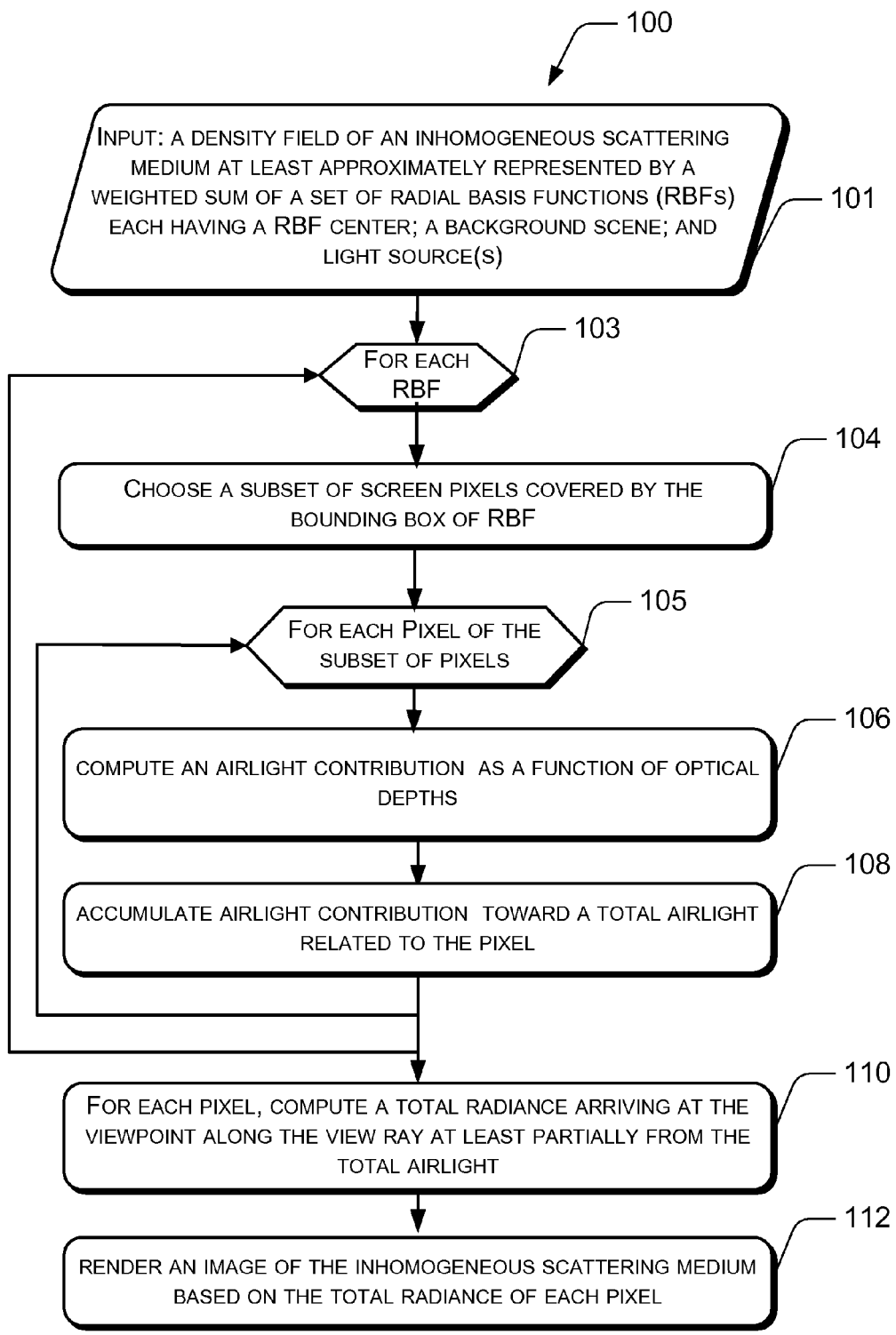
FIG. 1 shows an exemplary process for rendering an inhomogeneous scattering medium according to its airlight.

FIG. 1 shows an exemplary process for rendering an inhomogeneous scattering medium according to its airlight. The process 100 starts with input information at block 101 which includes a density field of the inhomogeneous scattering medium, a background scene, and light source(s). The density field is at least approximately represented by a weighted sum of a set of radial basis functions (RBFs) each having a RBF center. An exemplary RBF is a Gaussian as further described in detail herein. To further prepare for the next steps, view distance and light distance maps are generated based on the input information at block 101.

Block 103 indicates a repetition of a subprocess of blocks 104-108 for each RBF of the set of RBFs. At block 104, for each RBF, the process chooses a subset of screen pixels covered by the RBF. The position of each pixel and the viewpoint defines the direction of the corresponding view ray. For example, for a given viewpoint, a screen pixel corresponds to a view ray casting in a certain direction. An exemplary way to choose the subset of screen pixels covered by a certain RBF is to select a threshold defining a bounding sphere for the RBF and project the bounding sphere along of a view frustum (defined around an axis representing a broader general view direction) to form a 2-D bounding box. The 2-D bounding box is rasterized into multiple pixels in a screen display space. These multiple pixels constitute the subset of screen pixels corresponding to the RBF being projected.

It is appreciated that the bounding box may be substituted by a shape of any suitable configuration. For example, a tessellated sphere instead of a rectangular or square box may be used for this purpose.

Block 105 indicates a repetition of a subprocess of blocks 106 and 108 for each pixel of the subset of pixels.

At block 106, for the present RBF and for each pixel of the subset of pixels, the process computes an airlight contribution $L_i$ as a function of $T_i(v,b_i)$, $T_i(s,b_i)$, and $T_i(v,p)$, wherein $T_i(v, b_i)$ is the optical depth between a viewpoint v and the respective RBF center $b_i$; $T_i(s,b_i)$ is the optical depth between a light source s and the respective RBF center $b_i$; and $T_i(v,p)$ is the optical depth between the viewpoint v and a first surface point p intersecting a view ray $\hat{r}$ casting from the viewpoint v.

As will be shown in a separate section for the detail of the algorithms, in one embodiment, the airlight contribution $L_i$ is approximated by a function defined as $f^0(b_i^r)f^1(b_i)T_i(v,p)$, wherein $$f^0(b_i^r) \propto e^{-T_i(s,b_i^r)-T_i(v,b_i^r)+T_i(s,b_i)+T_i(v,b_i)}, \text{ and}$$

$$f^1(b_i)=\exp(-T(s,b_i)-T(v,b_i)),$$

where $-T_i(s,b_i^r)$ is the optical depth between the light source and a mean value point $b_i^r$ of the RBF, and $T_i(v,b_i^r)$ is the optical depth between a viewpoint v and a mean value point $b_i^r$ of the RBF. In one embodiment, the mean value point $b_i^r$ is the projection of the RBF center to the view ray.

In one embodiment, the inhomogeneous density field is at least approximately represented by $$\beta(x) = \sum_{i=1}^{n} \beta_i(x) + \beta_0,$$

where $\beta_i(x)$ are RBFs and $\beta_0$ is a constant representing a homogeneous density. If $\beta_0$ is non-zero, the process computes for each pixel (corresponding to a view ray) a homogeneous term $$L_0 = \beta_0 \int_v^p f(x)dx,$$

of the airtight, wherein $f(x)$ is a contributory scattering function defined as $$f(x) = k(\alpha(x))\frac{I_0}{d^2(x)}\exp(-T(v, x) - T(x, s)),$$

where $k(\alpha(x))$ is a scattering phase function of scattering angle $\alpha$, and $d(x)$ is the distance between the light source s and point x. The computed homogeneous term $L_0$ of the pixel is added to the same pixel's total airtight $L_a$.

Examples of the airtight function and approximations are illustrated in further detail in a later section of the description. As will be shown in further detail of the algorithm, in one exemplary embodiment approximation is taken such that above integration $$L_0 = \beta_0 \int_v^p f(x)dx$$

can be solved analytically.

At block 108, the process accumulates airtight contribution $L_i$ toward a total airtight $L_a$ related to the present pixel.

The light source s may be a point light. Furthermore, the inhomogeneous scattering medium may also be illuminated by an environment light $L^{in}$ in the addition to the light source s. In this case, for each pixel corresponding to the view ray, if the pixel is covered by the environment light $L^{in}$, the process may compute an environmental airtight and adds the environmental airtight to the total airtight $L_a$. In one embodiment, the environmental airtight is obtained based on computing a term $(L^{in}*NPSF)(\hat{r})T\exp(-T)$, where T is average optical depth around the viewpoint, NPSF is a point spread spherical function depending only on scattering phase function but independent of the scattering medium.

The subprocess of blocks 106 and 108 for each pixel may be performed multiple times with a repetition indicated at block 103, as a certain pixel may be covered by more than one RBF.

After the computation and accumulation of blocks 106 and 108 are done for all RBFs and their corresponding subsets of pixels, a final value for the airlight is obtained for each pixel.

At block 110, the process computes a total radiance L arriving at the viewpoint v along the view ray at least partially from the total airlight $L_a$. If the total airlight alone is used for rendering, block 110 is not needed. If there exist other light contributions, such as surface reflection (as will be discussed in a separate section of this description), the total radiance may be computed to include all necessary light contributions by properly considering attenuation, as discussed further in a separate section.

For example, when an object is placed in the inhomogeneous scattering medium, the process takes the surface reflectance into consideration. To do this, the process may incorporate the process shown FIG. 2 into the process of FIG. 1. The process may further compute an exitant radiance $L_p$ contributed by surface reflectance of the light source s at the surface point p, then compute an attenuated radiance arriving at the viewpoint v based on the exitant radiance $L_p$, and add the attenuated radiance to the total radiance L arriving at the viewpoint v along the view ray. As will be shown in further detail in a later section, in one example, the exitant radiance $L_p$ is computed as a function of a total incident illumination $L_p^{in-tot}$, a visibility $V_p$ of a distant environment at the surface point p and a bidirectional reflectance distribution function (BRDF) $B_{pv}$ assuming p is being viewed from v.

It is appreciated that if the inhomogeneous scattering medium is illuminated by multiple light sources, the computation process shown in FIG. 1 may be performed for each light source separately.

At block 112, the process renders an image of the inhomogeneous scattering medium based on the total radiance L. A pixel shader may be invoked in a GPU for this purpose.

Alternative to the above process shown in FIG. 1, the process may start with a pixel, find out all RBFs that cover the pixel, compute the airlight from the related RBFs for the pixel using the method described herein, and repeat the process for each pixel. However, it is generally easier to start with a RBF and find out the pixels that are related to the RBF than to start with a pixel and find out the RBFs that cover the pixel. The process described in FIG. 1 is therefore preferable.

Surface Reflectance

Figure 2:
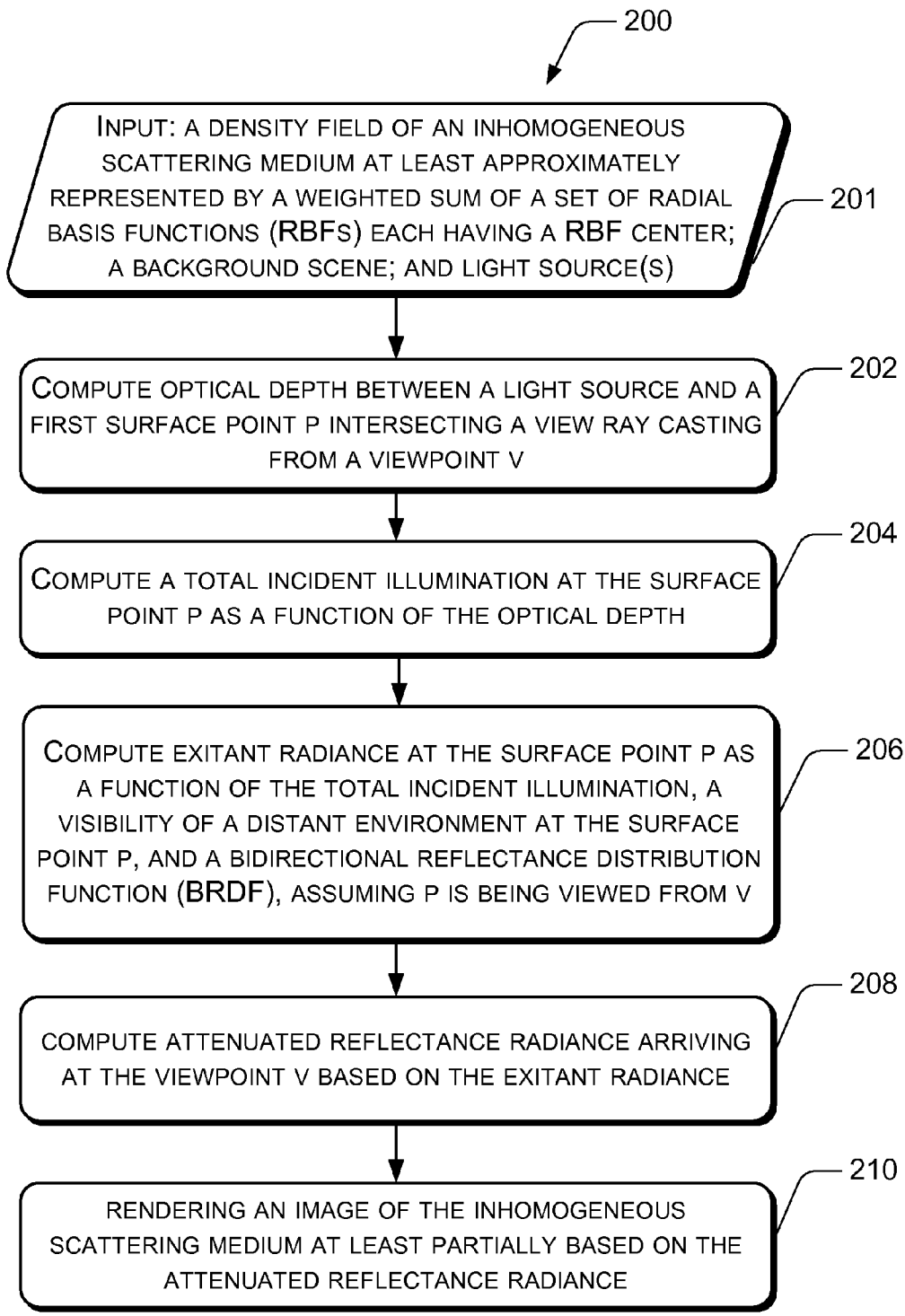
FIG. 2 shows an exemplary process for rendering an inhomogeneous scattering medium according to surface reflectance of an object surface placed in the inhomogeneous scattering medium.

FIG. 2 shows an exemplary process for rendering an inhomogeneous scattering medium according to surface reflectance of an object placed in the inhomogeneous scattering medium. The process 200 starts with input information at block 201 which includes a density field of the inhomogeneous scattering medium, a background scene, and light source(s). The density field is at least approximately represented by a weighted sum of a set of radial basis functions (RBFs) each having a RBF center. An exemplary RBF is a Gaussian as further described in detail herein. To further prepare for the next steps, view distance and light distance maps may be generated based on the input information at block 201.

At block 202, the process computes the optical depth between a light source and a first surface point p intersecting a view ray casting from a viewpoint v. Similar to that in FIG. 1, for a given viewpoint, a view ray casting from the viewpoint may correspond to a pixel on the screen display space. If the inhomogeneous scattering medium is illuminated by a point light source, the optical depth may be an optical depth between the point light source and the viewpoint. If the inhomogeneous scattering medium is illuminated by an environment lighting, the optical depth may be an average optical depth in all directions at around the surface point p. If the inhomogeneous scattering medium is illuminated by multiple light sources, the computation at block 202 may be performed for each light source separately.

At block 204, the process computes a total incident illumination $L_p^{in-tot}$ at the surface point p as a function of the optical depth.

At block 206, the process computes an exitant radiance $L_p$ at the surface point p as a function of the total incident illumination $L_p^{in-tot}$, a visibility $V_p$ of a distant environment at the surface point p and a bidirectional reflectance distribution function (BRDF) $B_{pv}$ assuming p is being viewed from v.

In particular, if the light source is a point lighting, the total incident illumination $L_p^{in-tot}$ may be computed according to the approximation $$L_p^{in-tot} = \frac{I_0 e^{-T(s,p)}}{d_{ps}^2}(T(s,p)\delta_{ps} * NPSF + \delta_{ps}),$$

where $\delta_{ps}$ is a delta function in the direction from p to s characterizing the point lighting; $I_0$ is the intensity of the point lighting; T(s,p) is the optical depth between the point lighting and the surface point p; $d_{sp}$ is the distance between the point lighting and the surface point p; and NPSF is a point spread spherical function depending only on scattering phase function but independent of the scattering medium.

Furthermore, if the inhomogeneous scattering medium is illuminated by an environment light in addition to the light source s, the process may further computes an attenuated environment radiance and acted to the total radiance L for rendering. This computation may involve the following steps:

(1) computing an average optical depth $\bar{T}(p)$ in all directions around the surface point p;

(2) computing an exitant environment radiance contributed by surface reflectance of the environment light at the surface point p based on the average optical depth $\bar{T}(p)$;

(3) computing an attenuated environment radiance arriving at the viewpoint v based on the exitant environment radiance; and (4) adding the attenuated environment radiance to the total airlight $L_a$ to obtain the total radiance L arriving at the viewpoint v along the view ray for the rendering.

At block 208, the process computes an attenuated reflectance radiance arriving at the viewpoint v based on the exitant radiance $L_p$.

At block 210, the process renders an image of the inhomogeneous scattering medium at least partially based on the attenuated reflectance radiance.

The above process of FIG. 2 may be combined with the process of FIG. 1 to render the inhomogeneous scattering medium based on a total radiance L which is contributed by both the airlight (computed using the process of FIG. 1) and the attenuated reflectance radiance (computed using the process of FIG. 2). To do that, the process of FIG. I is used to compute the airlight of the medium arriving at the viewpoint v for each pixel. The process also computes, for each pixel, a total radiance L arriving at the viewpoint v along the view ray based on the attenuated radiance and the airlight. In one embodiment, the process of FIG. 1 and process of FIG. 2 run in parallel or in serial for each pixel, and the combined process is repeated for all pixels. In another embodiment, the process of FIG. I is run for all pixels, and the process of FIG. 2 is run for all pixels separately, and the results from the two processes are then combined together.

Implementation Environment

The above-described analytical framework may be implemented with the help of a computing device, such as a personal computer (PC) or a game console.

Figure 3:
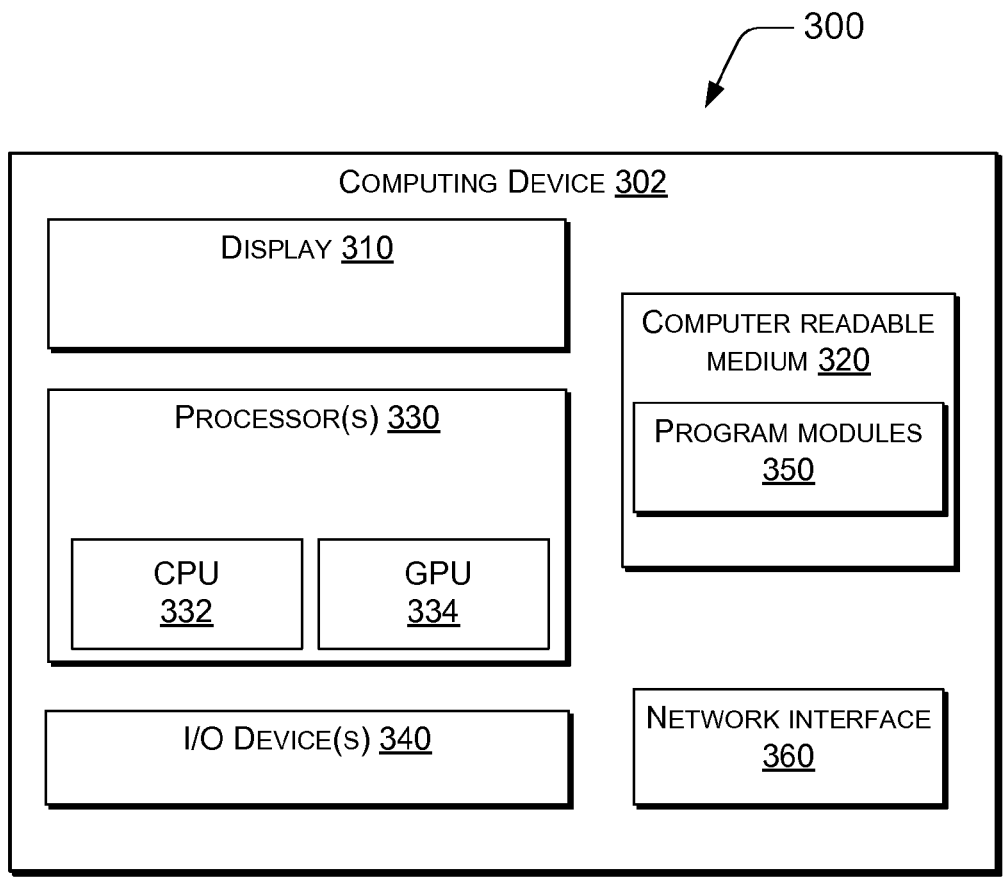
FIG. 3 shows an exemplary environment for implementing the method for rendering inhomogeneous scattering media.

FIG. 3 shows an exemplary environment for implementing the method for rendering inhomogeneous scattering media. The system 300 is based on a computing device 302 which includes display 310, computer readable medium 320, processor(s) 330, I/O devices 340, program modules 350 and network interface 360. Program modules 350 are implemented with the computing device 300. Program modules 350 contains instructions which, when executed by a processor(s), cause the processor(s) to perform actions of a process described herein (e.g., the processes of FIGS. 1-2) for rendering an inhomogeneous scattering medium.

For example, in one embodiment, computer readable medium 320 has stored thereupon a plurality of instructions that, when executed by one or more processors 330, causes the processor(s) 330 to:

(a) for each RBF, compute an airlight contribution to a pixel corresponding to a viewpoint and a view ray projecting to a screen space, wherein the airlight contribution is a function of optical depths $T_i(v,b_i)$, $T_i(s,b_i)$, and $T_i(v,p)$;

(b) for each RBF, accumulate airlight contribution toward a total airlight of the pixel; and (c) render an image of the inhomogeneous scattering medium at least partially based on the total airlight of each pixel.

The above system including computer readable medium 320 with program modules 350 may be implemented for an end-user or a designer, or both. When implemented for an end-user, the system may have predetermined data for the configuration of various scenes (e.g., the background, fog, and lights). A system may also take user input to allow the user to customize the scenes. When a certain scene is called by an application program (e.g., a game), the program modules 350 renders the scene based on the scene configuration data. Benefited by the algorithms and approximations described herein, the rendering can be real time. When implemented for a designer, various tools such as copy/paste, paintbrush, airbrush and eraser may be implemented to allow the designer to change a scene. Upon receiving the user input entered by the designer, the system renders the scene. Again, with the benefits of the present algorithms and approximations, the designer is allowed to see the effect of the modifications without too much delay, preferably instantly. For example, in one embodiment, the system 300 receives a user input which comprises a modification or update of a property of an inhomogeneous scattering medium. The property may be any one or a combination of density, optical property and lighting. The system 300 then renders in real time a stream of images of the modified or updated inhomogeneous scattering medium.

In one embodiment, the inhomogeneous scattering medium is a part of a video or animation consisting of a series of frames. The system described herein may be used for rendering the video or animation using a stream of consecutive frames. Each frame may be rendered using the process described herein.

To accomplish real-time rendering, processor(s) 330 preferably include both a central processing unit (CPU) and a graphics processing unit (GPU). For speedier rendering, as many as runtime components (such as the above steps (a), (b) and (c)) are preferably implemented with the GPU.

It is appreciated that the computer readable media may be any of the suitable memory devices for storing computer data. Such memory devices include, but not limited to, hard disks, flash memory devices, optical data storages, and floppy disks.

Furthermore, the computer readable media containing the computer-executable instructions may consist of component(s) in a local system or components distributed over a network of multiple remote systems. The data of the computer-executable instructions may either be delivered in a tangible physical memory device or transmitted electronically.

It is also appreciated that a computing device may be any device that has a processor, an I/O device and a memory (either an internal memory or an external memory), and is not limited to a personal computer. For example, a computer device may be, without limitation, a PC, a game console, a set top box, and a computing unit built in another electronic device such as a television, a display, a printer or a digital camera.

Algorithms and Exemplary Embodiments

Further detail of the techniques for rendering an inhomogeneous scattering medium is described below with theoretical background of the algorithms and exemplary embodiments. The techniques described herein are particularly suitable for real-time rendering of fog with shadowing effect on a background scene, as illustrated below.

Airlight in Inhomogeneous Media

Airlight refers to the appearance of the illuminated scattering medium when viewed directly. Knowledge of the airtight can be used being scattering medium itself and also to render reflective surfaces immersed in the medium.

Figure 4:
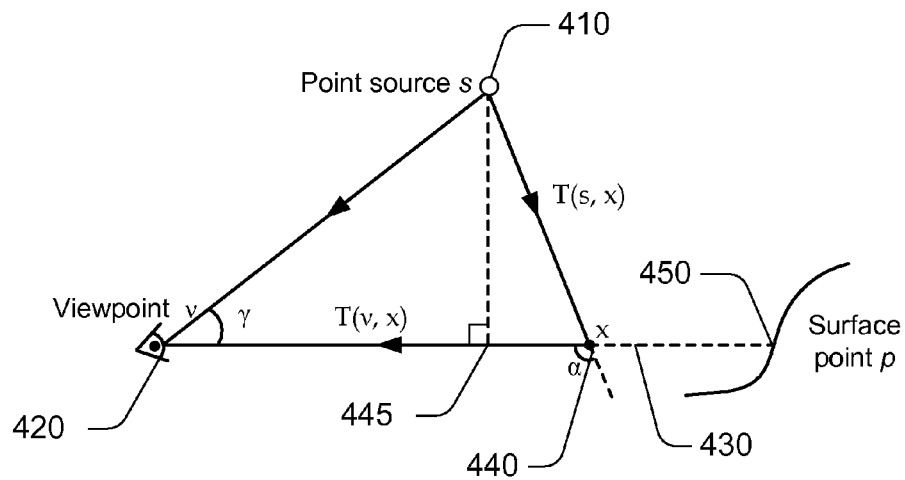
FIG. 4 is a diagram illustrating the airlight in a scattering medium.

FIG. 4 is a diagram illustrating the airtight in a scattering medium. The scattering medium is illuminated by the light source 410 at point s. The viewer is positioned at the viewpoint v 420. A view ray r 430 connects the viewpoint v 420 to the viewed point x 440 in the medium and further intersects at surface point p 450 with an object 455 immersed in the medium.

Airlight is governed by optical density (or more precisely, the density times the scattering coefficient) denoted $\beta(x)$ where x is the 3D spatial parameter. Along a view ray r parameterized by a distance parameter t, one has $$x(t) = v + t\hat{r} = v + t(p-v)/d_r \quad (1)$$

where v is the view point, p is the first surface point hit by the view ray, $d_r = d_{vp} = \|p-v\|$ is the distance along the view ray to p, and $\hat{r} = \hat{r}_{vp} = (p-v)d_{vp}$ is the unit-length view direction. Airlight $L_a$ due to a point light source 410 of intensity $I_0$ at location s scattered in the direction of r is given by the following 1D integral:

$$L_a = \int_0^{d_r} \beta(x) k(\alpha(x)) \frac{I_0}{d^2(x)} \exp(-T(v,x) - T(x,s)) dt. \quad (2)$$

The function d(x) is the distance of the light source s to x, given by $$d(x) = d_{sx} = \|x-s\| = \sqrt{(x-x_s)^2 + h^2}$$

where $x_s$ is the point along the view ray closest to s, and $h = \|s-x_s\|$ is the distance of the source to the view ray. $k(\alpha)$ is the scattering phase function where the scattering angle $\alpha$ is defined by $\cos(\alpha(x)) = (x-x_s)/d(x)$. For isotropic scattering, $$k(\alpha) = \frac{1}{4\pi},$$

but the algorithm and approximation described herein can be applied to anisotropic scattering as well. Since x is a function of the ray parameter t, so are d and α.

As a general notion, the optical depth between two 3D points a and b, T(a,b), where points a and b may be substituted by any pair of points (such as s and v) discussed herein, is given by the 1D integral of optical density between a and b:

$$T(a, b) = \int_0^{d_{ab}} \beta(a + t\hat{r}_{ab}) dt \tag{3}$$

where $d_{ab}=\|a-b\|$ and $\hat{r}_{ab}=(b-a)/d_{ab}$. Direct attenuation of light along the path from a to b is then given by $\exp(-T(a,b))$.

To simplify the notation, a function $f(x)$ is defined as $$f(x) = k(\alpha(x)) \frac{I_0}{d^2(x)} \exp(-T(v, x) - T(x, s)), \tag{4}$$

so that $$L_a = \int_0^{d_r} \beta(x) f(x) dt. \tag{5}$$

The density $\beta(x)$ of the inhomogeneous scattering medium may be modeled (e.g., approximate it) as a sum of RBFs such as Gaussians:

$$\beta(x) = \sum_{i=1}^{n} \beta_i(x) + \beta_0 \tag{6}$$

where $$\beta_i(x) = c_i \exp(-a_i^2 \|x - b_i\|^2). \tag{7}$$

$a_i$ represents the Gaussian's scale, $b_i$ its center, and $c_i$ its amplitude.

Then expanding $\beta(x)$ in ((5)), one obtains $$L_a = \sum_{i=1}^{n} \int_0^{d_r} \beta_i(x) f(x) dt + \beta_0 \int_0^{d_r} f(x) dt \tag{8}$$

$$= \sum_{i=1}^{n} L_i + L_0.$$

That is, airtight $L_a$ includes a set of Gaussian terms $L_i$ and a homogeneous term $L_0$. The computation of Gaussian terms $L_i$ and a homogeneous term $L_0$ is illustrated below with reference to FIG. 5.

Figure 5:
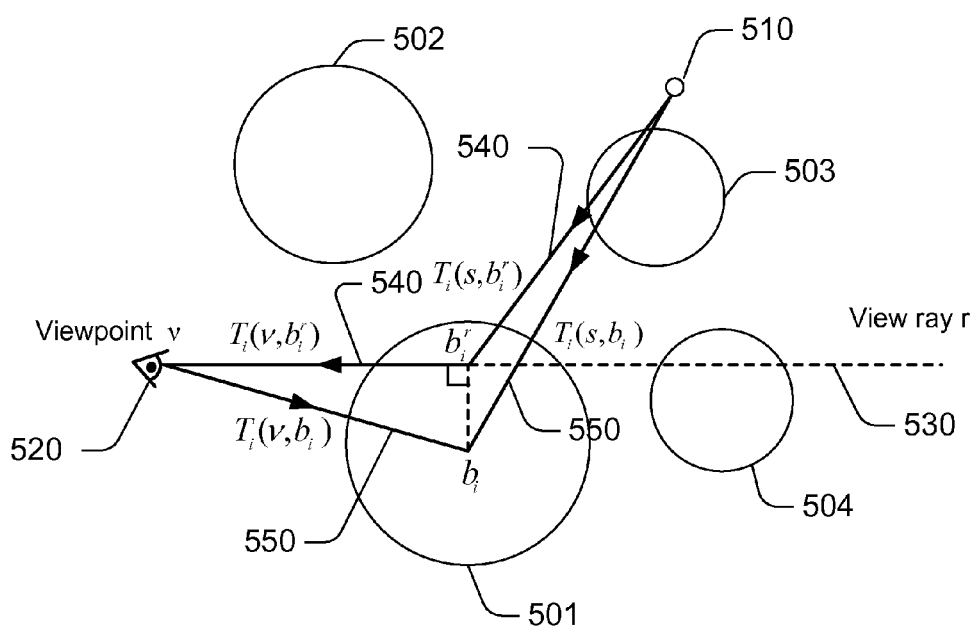
FIG. 5 is an illustration of light paths for scattering integration in an inhomogeneous medium density represented by a sum of Gaussians.

FIG. 5 is an illustration of light paths for scattering integration in an inhomogeneous medium density represented by a sum of Gaussians. The scattering analysis and computation is done for each Gaussian. In FIG. 5, four exemplary Gaussians 501, 502, 503 and 504, are shown, each represented by a sphere with different centers. The Gaussian 501 represents the current Gaussian i for which the light path is being studied. The Gaussians are illuminated by light source 510. The view ray $\hat{r}$ 530 casts from the viewpoint 520, traversing the current Gaussian i 501. As will be shown below, the light path 540 (from the light source 510 to point $b_i^r$ and then to the viewpoint 520) enters the viewpoint 520 along the view ray $\hat{r}$ and is used for the optical depth integration of the Gaussian i itself. The light path 550, which passes the center $b_i$ of the Gaussian i 501 and is independent of the view ray $\hat{r}$, is used to integrate the rest of the Gaussians $j \neq i$.

The above equation (8) includes a sum of Gaussian terms and a homogeneous term, which are discussed below.

Gaussian Terms—To evaluate the Gaussian terms $$L_i = \int_0^{d_r} \beta_i(x) f(x) dt, \tag{9}$$

it is assumed that the variation in $f(x)$ is small with respect to the variation in the RBFs $\beta_i(x)$. According to the mean-value theorem for integration, there exists a mean value point $0 \leq t_m \leq d_r$ in the Gaussian i (501) such that $$L_i = f(x_m) \int_0^{d_r} \beta_i(x) dt,$$

where $x_m = x(t_m)$. Since $\beta_i(x)$ is a Gaussian, most of its energy concentrates at the projection $b_i^r$ of its center $b_i$ to the view ray (the projection may be restricted to the segment from v to p on the view ray). The projection $b_i^r$ is defined as $$b_i^r = v + ((b_i - v) \cdot \hat{r}) \hat{r}. \tag{10}$$

In one exemplary approximation, one takes $x_m = b_i^r$, yielding $$L_i \approx f(b_i^r) \int_0^{d_r} \beta_i(x) dt \tag{11}$$

A Gaussian can be analytically integrated along the view ray, allowing evaluation of the second factor $$\int_0^{d_r} \beta_i(x) dt.$$

Figure 6:
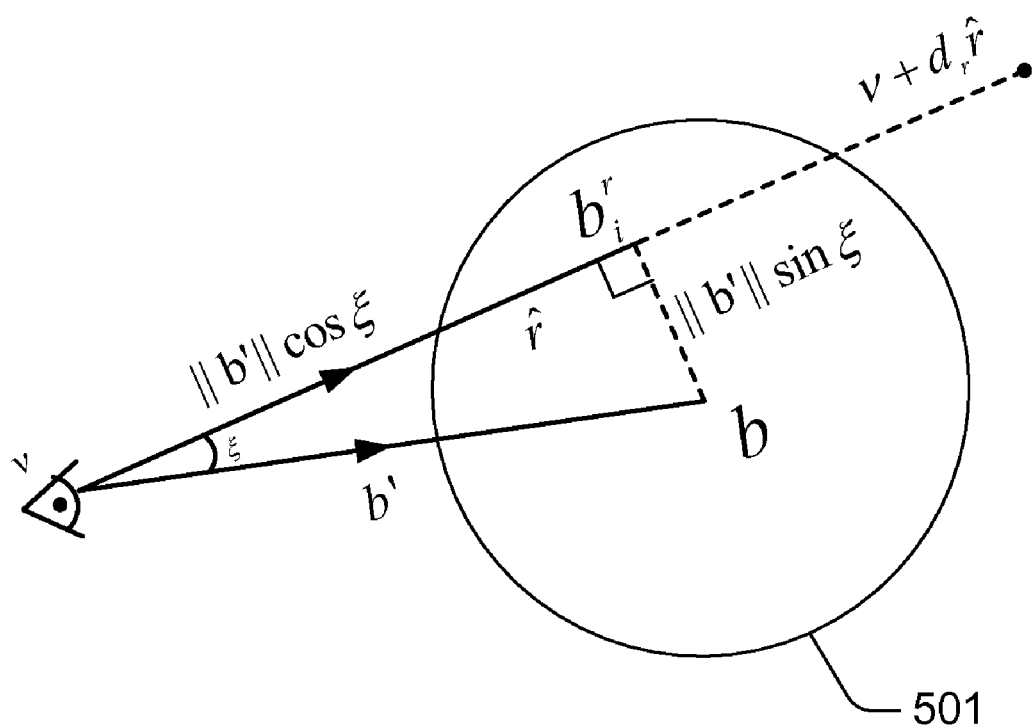
FIG. 6 is an illustration of an exemplary line integration of a Gaussian.

FIG. 6 is an illustration of an exemplary line integration of a Gaussian. For example, a Gaussian 501 with a center b expressed as $$G(x) = c \, e^{-a^2 \|x - b\|^2}$$

over the ray r in eq. (1) yields the 1D integral over t given by $$y = \int_0^{d_r} c \, e^{-a^2 \|x(t) - b\|^2} dt.$$

Letting $b' = b - v$ and $\hat{b}' = b'/\|b'\|$ where v is the view point, one has $$y = \int_0^{d_r} c \exp(-a^2 \|t\hat{r} - b'\|^2) dt \tag{11a}$$

$$= \int_0^{d_r} c \exp(-a^2 ((t - \|b'\| \cos \xi)^2 + \|b'\|^2 \sin^2 \xi)) dt$$

$$= c e^{-a^2 \|b'\|^2 \sin^2 \xi} \int_0^{d_r} \exp(-a^2 (t - \|b'\| \cos \xi)^2) dt$$

$$= ce^{-a^2} \|b'\|^2 \sin^2 \xi \frac{\sqrt{\pi}}{2a}$$

$$(\text{erf}(a(d_r - \|b'\|\cos\xi)) - \text{erf}(a(-\|b'\|\cos\xi)))$$

where $\xi$ is the angle between $\hat{r}$ and $\hat{b}'$, cos $\xi = \hat{r} \cdot \hat{b}'$, and sin $\xi = \|\hat{r} \times \hat{b}'\|$.

The error function, denoted erf(x), is a standard mathematical function whose numerical evaluation can be found in many published works. For example, one may use a fast Chebyshev approximation given by $$\text{erf}(x) \approx \begin{cases} \text{sgn}(x), & |x| > 2.629639 \\ \begin{pmatrix} 0.0145688z^6 - 0.0348595z^5 + \\ 0.0503913z^4 - 0.0897001z^3 + \\ 0.156097z^2 - 0.249431z + \\ 0.533201 \end{pmatrix} x, & |x| \le 2.629639 \end{cases}$$

where $z = 0.289226x^2 - 1$. This approximation has absolute error less than $2 \times 10^{-4}$ for all x.

According to equation (4), evaluating $f(b_i^r)$ in equation (11) involves computing the optical depths $T(v, b_i^r)$ and $T(s, b_i^r)$ from $b_i^r$ to the view point v and light point s. But it may be impractical to compute these by summing over all n RBFs for each view ray. In one embodiment, approximation is introduced to simplify the computation as discussed below.

The approximation uses the correct light path 540 $s \to b_i^r \to v$ for the Gaussian i itself, but simplify it to light path 550 $s \to b_i \to v$ for the rest of the Gaussians $j \ne i$ (see FIG. 5). The second light path 550 is simpler because it no longer depends on the view ray. This yields the approximate factorization $$f(b_i^r) \approx f^0(b_i^r) f^1(b_i), \quad (12)$$

where $$f^0(b_i^r) = \frac{1}{4\pi} \frac{I_0}{\|b_i^r - x_s\|^2 + h^2} e^{-T_i(s,b_i^r) - T_i(v,b_i^r) + T_i(s,b_i) + T_i(v,b_i)}$$

and $$f^1(b_i) = \exp(-T(s, b_i) - T(v, b_i)). \quad (13)$$

Indexed optical depth $T_i(a,b)$ is defined as in equation (3), but with respect to the i-th Gaussian $\beta_i(x)$ alone; i.e.

$$T_i(a, b) = \int_0^{d_{ab}} \beta_i(a + t\hat{r}_{ab}) dt.$$

The addition of the $T_i(s,b_i) + T_i(v,b_i)$ term in the exponent of $f^0$ compensates for using optical depth T with respect to all Gaussians in $f^1$, when $f^0$ has already accounted for Gaussian i via the correct light path.

The benefit of this factorization is that $f^1$ does not vary per view ray, and $f$ can be now computed using four Gaussian line integrals rather than n. Furthermore, only two of these four line intergals vary per view ray; the other two are computed in a separate pass as described in a later section for computing optical depths. When the points $b_i$ and $b_i^r$ are close, this factorization is clearly accurate. It is also accurate when they are distant since both $L_i$ and our approximation to it then approach 0.

Homogeneous Term—To evaluate the homogeneous term $$L_0 = \beta_0 \int_0^{d_r} f(x) dt, \quad (14)$$

a similar factorization approximation may be used based on approximate light paths. In one embodiment, $L_0$ is split into two factors by separately considering the light path $s \to x \to v$ with respect to the homogeneous medium modeled by $\beta_0$, and the simpler light path $s \to v$ for the RBF sum modeling the medium inhomogeneity. This yields $$f(x) \approx \frac{1}{4\pi} \frac{I_0}{d^2(x)} e^{-\beta_0(\|v-x\| + \|s-x\|)} e^{-T(s,v) + \beta_0\|s-v\|} \quad (15)$$

$$= C_{sv} \frac{1}{4\pi} \frac{I_0}{d^2(x)} \exp(-\beta_0(\|v-x\| + \|s-x\|))$$

where $$C_{sv} = \exp(-T(s, v) + \beta_0\|s - v\|). \quad (16)$$

With this approximate $f(x)$, the integration in equation (14) can be done analytically as disclosed in Sun, et al., "A Practical Analytic Single Scattering Model for Real Time Rendering", ACM Trans. Gr. 24, 3, 1040-1049, 2005, since the only dependence on x in the integrand is with respect to a constant density $\beta_0$. Summarizing that method briefly here, homogeneous airlight due to a constant density $\beta$, denoted $L_a^h(\gamma, d_{sv}, d_{vp}, \beta)$, is given by $$L_a^h = A_0 \left[ F\left(A_1, \frac{\pi}{4} + \frac{1}{2}\arctan\left(\frac{T_{vp} - T_{sv}\cos\gamma}{T_{sv}\sin\gamma}\right)\right) - F\left(A_1, \frac{\gamma}{2}\right) \right]$$

where $T_{sv} = \beta d_{sv}$, $T_{vp} = \beta d_{vp}$, $$A_0 = \frac{\beta^2 I_0 e^{-T_{sv}\cos\gamma}}{2\pi T_{sv}\sin\gamma},$$

$A_1 = T_{sv} \sin \gamma$, and $$F(u, v) = \int_0^v \exp(-u\tan\xi) d\xi \cdot \gamma$$

is the angle formed by the view direction $\hat{r}$ and the direct path from view point to light point; i.e. cos $\gamma = \hat{r} \cdot \hat{r}_{sv}$. Using this formula, the homogeneous term in equation (14) is then given by $$L_0 \approx C_{sv} L_a^h(\gamma, d_{sv}, d_{vp}, \beta_0). \quad (17)$$

In most exemplary cases tested, the above approximation accurately matches a full, Monte-Carlo simulation of single scattering. Some cases, the the results using the above approximation is less accurate.

Surface Reflectance in Inhomogeneous Media

In this description, $L_p$ denotes the reflected radiance of the surface at point p emitted back to the viewpoint v when illuminated by airtight. $L_p$ can be computed using the point spread function or PSF, governing how radiance is blurred and attenuated by the scattering medium before illuminating the surface. Using PSFs will allow the model described herein to be extended to environmental lighting, arbitrary BRDFs, and precomputed radiance transfer (PRT).

For homogeneous media, single-scattered radiance $L_p^{in-ss}(\omega)$ incident at a surface point p in all directions $\omega$ can be accurately approximated by the following spherical convolution $$L_p^{in-ss}(\omega) = (L_p^{in} * PSF)(\omega), PSF(\gamma) = T_{sp}e^{-T_{sp}}NPSF(\gamma), \quad (18)$$

where $L_p^{in}(\omega)$ is the radiance incident at p neglecting the scattering medium, $\gamma$ is the angle between the original and scattered lighting directions, and $T_{sp} = \beta d_{sp}$ is the optical depth of the medium from s to p. Spherical convolution is denoted by $f*g$ where $f$ and $g$ are spherical functions and g is circularly symmetric about the (canonical) z axis. NPSF($\gamma$) is a spherical function that depends only on the scattering phase function but is independent of the scattering medium:

$$NPSF(\gamma) = \frac{F\left(\sin\gamma, \frac{\pi}{2}\right) - F\left(\sin\gamma, \frac{\gamma}{2}\right)}{2\pi\sin\gamma \cdot e^{(\cos\gamma - 1)}}.$$

In other words, the scattering effect of the medium on incident radiance can be approximated by a constant convolution with NPSF followed by a multiplication with the scalar $T_{sp}e^{-T_{sp}}$.

The total illumination incident at p then sums the singly scattered plus directly attenuated incident illumination:

$$L_p^{in-tot}(\omega) = L_p^{in-ss}(\omega) + L_p^{in-att}(\omega) \quad (19)$$
$$= T_{sp}e^{-T_{sp}}(L_p * NPSF)(\omega) + e^{-T_{sp}}L_p^{in}(\omega).$$

Illuminating the surface using this PSF-based approximation, the outgoing radiance at p in the view direction is given by the scalar $$L_p = \langle L_p^{in-tot} | V_p | B_{pv} \rangle, \quad (20)$$

where the triple product is defined by the spherical integral $$\langle f_1 f_2 f_3 \rangle = \int_{\omega \in s} f_1(\omega) f_2(\omega) f_3(\omega) d\omega.$$

The spherical function $V_p$ represents visibility of the distant environment at p (due to the presence of scene occluders, not the medium), and $B_{pv}$ represents the BRDF assuming p is being viewed from v. The separation of object visibility $V_p$ from incident radiance $L_p^{in-tot}$ implied by the triple product formula is an approximation which assumes that the shadowing scene objects are nearby with respect to the medium's extent.

In the exemplary embodiment, the spherical harmonic (SH) vectors of order 4-6 are used for lighting, BRDF, and visibility/PRT. Low order vectors represent only low-frequency directional dependence, which is appropriate for fairly matte surfaces or smooth lighting.

Mathematics used for the above spherical harmonics (SH) is briefly summarized below.

Let $f(\omega)$ be a spherical function, represented by the SH vector $f_{lm}$. An order-n expansion requires $n^2$ vector components. Let $g(\omega)$ by a function circularly symmetric about z, which can be represented by the SH vector $g_l$ (its symmetry implies its only nonzero coefficients have m=0). Convolving f by g yields:

$$(f*g)_{lm} = \sqrt{\frac{4\pi}{2l+1}} f_{lm}g_l. \quad (21)$$

Evaluating f at the spherical point $\omega$ is computed via $$f(\omega) = \sum_{l=0}^{n-1} \sum_{m=-l}^{+l} f_{lm}y_{lm}(\omega). \quad (22)$$

where $y_{lm}$ are the SH basis functions. Rotating g from its canonical center at z to an arbitrary one z' is computed via $$rot(g, z \to z')_{lm} = \sqrt{\frac{4\pi}{2l+1}} g_l y_{lm}(z'). \quad (23)$$

An SH delta function, $\delta$, is the "peakiest" or most directional function that can be produced by a given SH order. If it is canonically centered around z, its coefficients are given by $$\delta_l = y_{l0}(z). \quad (24)$$

For convenience, the first six SH coefficients of NPSF (as with any circularly symmetric function about z, only the m=0 components are nonzero) are listed: 0.332818, 0.332488, 0.302428, 0.275773, 0.254051, 0.236333. These form the $g_l$ coefficients used in the convolution formula (21).

With the above background, surface reflectance in inhomogeneous media is computed using the following algorithms and approximations respect to various light sources.

Point lighting for a point light source—a point light may be approximately represented by $$L_p^{in} = \frac{I_0}{d_{ps}^2} \delta_{ps},$$

where $\delta_{ps}$ is the delta function in the direction from p to s. Its SH coefficients can be computed using formulas (24) and (23).

To calculate the equation (19), an exemplary approximation is made that the optical density equals the average density from s to p. This simply replaces the optical depth $T_{sp} = \beta d_{sp}$, in that formula assuming a homogeneous density $\beta$, with the integrated version, T(s,p), with respect to the inhomogeneous medium along the path from s to p as defined in ((3)). We thus obtain the SH vector $$L_p^{in-tot} = \frac{I_0 e^{-T(s,p)}}{d_{ps}^2}(T(s, p)\delta_{ps} * NPSF + \delta_{ps}). \quad (25)$$

The above approximation works well because the incident illumination is a delta function in the direction $\hat{r}_{ps}$. Thus, singly-scattered airlight drops to zero rapidly as the angle $\gamma$ with respect to $\hat{r}_{sp}$ gets larger. The approximation therefore captures the inhomgeneous medium's variation with direction well, by integrating over the actual medium in the single direction $\hat{r}_{ps}$. Optical depth T(s,p) is computed using an RBF splatting method which will be described in the next section.

Environmental Lighting—Distant environmental lighting is modeled using a spatially invariant SH vector $L^{in}$. To model how this light is scattered before hitting a receiver point p, an exemplary approximation is taken that the optical depth equals the average depth in all directions around p, defined by $$\overline{T}(p) = \frac{1}{4\pi} \int_{\omega \in S} T(p + d_\omega \omega, p) d\omega. \tag{26}$$

where $S=\{\omega|\omega_x^2+\omega_y^2+\omega_z^2=1\}$. Then one may simply replace the optical depth $T_{sp}$ in ((19)) with this average depth $\overline{T}(p)$, yielding $$L_p^{in-tot} = \overline{T}_p e^{-\overline{T}_p}(L^{in} * NPSF) + e^{-\overline{T}_p} L^{in}. \tag{27}$$

To compute $\overline{T}(p)$, one has $$\overline{T}(p) = \frac{1}{4\pi} \int_{\omega \in S} \int_0^D \beta(p + t\omega) dt\, d\omega$$

$$= \beta_0 D + \sum_{i=1}^n \left( \frac{1}{4\pi} \int_{\omega \in S} \int_0^D \beta_i(p + t\omega) dt\, d\omega \right)$$

$$= \beta_0 D + \sum_{i=1}^n \overline{T}_i(p),$$

where $D > d_\omega$ bounds the distance of p to the environment. In one embodiment, a fixed and large value is used for all points and all directions, which assumes the size of the object is small compared to the distance to the environment map.

$\overline{T}_i(p)$ is the average optical depth from the i-th Gaussian $\beta_i$. To calculate $\overline{T}_i(p)$, one may tabulate the average optical depth of a special Gaussian with a=c=1 and b=0 as a 1D table:

$$\overline{T}(\|u\|) = \frac{1}{4\pi} \int_{\omega \in S} \int_0^\infty \exp(Pu + t\omega P^2) dt\, d\omega,$$

where u is a point on the z axis. Since D is large, we obtain $$\overline{T}_i(p) = \frac{c_i T(a_i \|p - b_i\|)}{a_i}.$$

$\overline{T}(p)$ is then computed by summing each Gaussian's contribution $\overline{T}_i(p)$.

Shading with PSF-Scattered Radiance—Given the total scattered radiance incident at p, $L_p^{in-tot}$ defined in equation (25) or equation (27), one may shade by applying integration (20). Efficient methods for computing the SH triple product are described in Snyder, "Code Generation and Factoring for Fast Evaluation of Low-Order Spherical Harmonic Products and Squares", Tech. Rep. MSR-TR-2006-53, Microsoft Corporation, 2006.

One can also specialize equation (20) in two important cases: when shading with an arbitrary BRDF but without PRT shadowing, or with a diffuse receiver with PRT. Let $B_{pv}$ denote the SH vector representing the BRDF weighting assuming a view point v. A PRT vector represents how the object shadows and inter-reflects light onto itself at receiver point p with respect to a low-frequency, distant lighting basis and is represented by the SH vector $P_p$. Then the resulting shading in either case is obtained simply by dotting $L_p^{in-tot}$ with either $B_{pv}$ or $P_p$. This requires only a simple dot product rather than an expensive SH triple product.

If the view ray does not hit any surface point, one may still like to see glows around bright sources in the environment. The PSF-based approximation in equation (18) can be used to calculate the environmental airlight via $$L_a(\hat{r}) = T(v,p) e^{-T(v,p)} (L^{in} * NPSF)(\hat{r}), \tag{28}$$

where T(v,p) is the screen optical depth computed as described in a later section in this description for calculating optical depths. In this case, the integration depth $d_r \to \infty$ since no surface is hit. In an exemplary embodiment, the algorithm at this point precomputes the convolution of the lighting environment with NPSF and stores this as a cube map.

The PSF method can easily be specialized to diffuse or Phong BRDF models. On the other hand, it is also possible to generalize the model in equations (17) and (18) for reflectance of a Lambertian plus specular Phong surface in airlight, using the same approach of replacing its $T_{sp} = \beta\, d_{sp}$ (which assumes constant optical depth) with the inhomogeneous depth integrated along the path, T(s,p). While this method is restricted to the diffuse+Phong surface reflectance model, it is theoretically more accurate in that case. In some examples tested, it has been found that the results of the two methods are almost indistinguishable for diffuse surfaces.

Using the above shading technique, scattering effects on surface reflectance may be simulated. In one example tested, steam emitted from a teapot scatters light which affects the appearance of a nearby teapot, showing the softening in the shading and specular highlights, and the steam's shadow.

Rendering Pipeline

The total radiance arriving at the view ray r, denoted L, is modeled via $$L = L_a + \exp(-T(v,p)) L_p. \tag{29}$$

The above equation supports attenuation through the medium but neglects scattering effects once the light leaves the surface point p. Since surfaces are typically much dimmer than light sources, capturing just this first-order effect is a reasonable approximation.

Computing $T(v,b_i)$ and $T(s,b_i)$—As illustrated above with reference to FIG. 5, computing airlight $L_a$ requires the factor $f^1(b_i)$, which in turn requires exponentiating optical depths $T(v,b_i)$ and $T(s,b_i)$ along the light path 550 through each of the n Gaussian centers $b_i$. The computation of these quantities is independent of the actual view rays (and thus independent of pixels). The computation can thus be done just once for each configuration of the inhomogeneous scattering medium and lighting, and the results can be used for every pixel. The following describes an exemplary algorithm for computing $T(v,b_i)$; substituting the light source position s for v as the ray origin then allows computation of $T(s,b_i)$.

A plane sweep is performed on the CPU to find the subset of RBFs that contribute along each of the n rays from v to $b_i$. Each ray direction is represented by the spherical point $\hat{b}_i = (b_i-v)/\|b_i-v\|$ which is converted to 2D spherical coordinates, $(\theta_i, \phi_i)$. Each RBF is then bounded using an interval over 2D spherical coordinates such that the line integration result for any ray with origin v is sufficiently small outside this bound. From equation (11a), it can be seen that the line integral declines exponentially as a function of distance $\|b_i-v\|$ and the sine of the angle $\xi$ between $\hat{r}$ and $\hat{b}_i$, due to the factor $$c_i e^{-a_i^2 \|\hat{r} \times (b_i - v)\|^2} = c_i e^{-a_i^2 \|b_i - v\|^2 \sin^2 \xi}.$$

Thus, the bounding box may be based on the threshold $$\sin \xi \le \frac{\sqrt{\ln c_i - \ln \epsilon}}{a_i P b_i - vP} = \sin \xi_i \qquad (30)$$

where $\epsilon = e^{-9}$. This represents a cone around the central direction $\hat{b}_i$.

A segment search tree algorithm, such as that described in O'Rourke, 1998, "Computational Geometry in C, Second Edition", Cambridge, University Press, Cambridge, England, may be then used to query the subset of RBFs whose 2D intervals cover each spherical point $(\theta_i, \phi_i)$, producing a list of $n_i \le n$ RBFs denoted $\beta_{i_1}, \beta_{i_2}, \ldots, \beta_{i_{ni}}$ which have a contribution on the ray from v to $b_i$. The list of the RBFs constitute a subset of all RBFs. The complexity of the algorithm is O(nlogn+k) where n is the number of RBFs and k is the number of intervals reported. The list for each i is then sent to the GPU, which performs the 1D Gaussian integration using equation (11a) for each of the $\beta_{i_j}$, yielding $T_{i_j}(v,b_i)$. Finally, the results over all $n_i$ Gaussians are summed to obtain $T(v,b_i)$.

Integrating Optical Depth in All Directions—In order to compute other optical depths such as T(v,p) and T(s,p), the algorithm integrates optical depth around the view point v and each light point s. This is similar to the computation of $T(v,b_i)$ and $T(s,b_i)$ in the previous section, except that the integration is done in all directions around each ray origin instead of to n Gaussian centers $b_i$, and the integration proceeds from the ray origin (viewpoint v or light source s) until the first intersected surface (p) instead of stopping at the Gaussian center. Maps of optical depth are computed around the view point for attenuating airlight in equation (29), and around each light point for rendering surface reflectance in equation (20).

One exemplary embodiment uses an RBF splatting techique on the GPU to integrate optical depths in all directions. The display screen is used as the render target when accumulating optical depth around the view point. Light source is specified. For instance, six images forming a cube map are used for light sources. For each Gaussian i, the algorithm first computes a bounding sphere with radius $r_i = \|b_i - v\| \sin \xi_i$ around its center $b_i$. This threshold from equation (30) ensures that $\|x - b_i\| > r_i \Rightarrow \beta_i(x) < \epsilon$. The bounding sphere is then projected to the near plane of the view frustum and to result in a 2D bounding box, which is rasterized. A pixel shader is invoked to compute the 1D integral along that pixel's view ray using equation (11a). All Gaussians are then accumulated using alpha blending hardware to produce the per-pixel integrated result.

Algorithms for Accumulating Airlight—FIG. 7 shows an exemplary algorithm for accumulating airlight. The algorithm of FIG. 7 is used to simultaneously accumulate optical depth around the view point as well as integrate airlight. Here, $L_a$, T, and $d_{vp}$ denote maps over all screen pixels. Map references are thus implicitly evaluated at each pixel's view ray.

In FIG. 7, conventional programming notations are used. For example, // means comment. The text following // is just comments to help understanding, and is not operative in the algorithm. ← means assignment. For example, $L_i \leftarrow 0$ means "assign value 0 to $L_i$". += means accumulate. For example, $L_i += f^0(b_i^r) f^1(b_i) T_i(v,p)$ means "compute $f^0(b_i^r) f^1(b_i) T_i(v,p)$, add the computation value to $L_i$'s previously assigned value, and assign the new value to $L_i$".

The computation $L_i += f^0(b_i^r) f^1(b_i) T_i(v,p)$ in FIG. 7 is based on equation (11) and the factorization described therewith. By definition, $d_r = d_{vp} = \|p - v\|$, and $$\int_0^{d_r} \beta_i(x) dt = T_i(v, p).$$

An Exemplary Rendering Pipeline: based on the above-described computations, an exemplary rendering pipeline as described in the following may be used to render a complete scene with fog having both airlight and surface reflectance taken into account to show scattering effects.

1. Render view distance and light distance maps, $d_{vp}$ and $d_{sp}$.
2. Accumulate the optical depth map around each light source, T(s,p), using the RBF splatting described above.
3. If there is a environment map, accumulate the average optical depth for each vertex, $\overline{T}(p)$.
4. Render the scene (i.e., compute the vertex shading $L_p$) using incident lighting from equation (25) or equation (27), as described above.
5. Compute optical depths $T(v,b_i)$, T(s,v) and $T(s,b_i)$ using the plane sweep algorithm described above.
6. Accumulate airlight using the algorithm described above, yielding the airlight $L_a$ and screen optical depth T(v,p) targets. In one exemplary implementation, four lights are packed together and treated in a single pass.
7. Attenuate the scene target using the optical depth target and add the airlight target, via equation (29).

The above step 3 forms the bottleneck in computation. To speed up the computation, instead of computing $\overline{T}$ for each vertex, in one exemplary embodiment one may compute it only at the centroid of each object. All vertices of the object then share the same $\overline{T}$. A more sophisticated method could use VQ clustering to generate a small set of uniformly-distributed representatives which are blended at each vertex.

The above step 6 is also computationally expensive. One exemplary embodiment computes the airlight and screen optical depth targets at lower (e.g. ¼) resolution. The distance map $d_{vp}$ is first down-sampled. After the airtight and screen optical depth are computed (at reduced resolution), the algorithm upsamples them back to the screen resolution. For pixels whose full-resolution neighborhood spans too great a range in the depth map, the algorithm may use the low-resolution result having the smallest difference with the desired high-resolution depth value. The rest of the pixels are then bilinearly interpolated.

Adding Noise—In some scenes, for instance one that has steam, adding noise makes the steam look more realistic. The noise scheme based on the present rendering system disturbs the optical depth consistently in world space and makes the media appear more irregular and realistic. The rendering system described herein can add noise to convey the irregularity of real fog and smoke without unduly increasing the number of RBFs. This can be done by perturbing T(v,p) computed in, for instance, the exemplary algorithm of FIG. 7. More precisely, when computing $T_i(v,p)$ for each pixel covered by a Gaussian i, one may perturb the view ray using a tileable 3D Perlin noise texture and compute the line integral along this perturbed direction. The integration distance $d_r$ is left unchanged.

The noise texture may be indexed by the 3D point $b_i^r$. The result is then scaled by $r_i / \|v - b_i\|$, transformed to view space by multiplying by the current view matrix, and finally added to the original direction. Adding noise in world space ensures consistency when the camera changes. The scale of the perturbation is user-adjustable. One may also add a constant displacement to the $b_i^r$ noise texture index which can be animated.

Creating Inhomogeneous Media

The fast rendering algorithms described herein enable a set of easy-to-use tools to be used to create inhomogeneous media, including paintbrush, airbrush, eraser, and particle system simulator. Existing animation data of smoke or clouds generated using advected RBFs or a commercial animation system (e.g. Autodesk® Maya®) can also be imported and rendered in the present system, but at a much faster speed.

Copy/Paste—The system allows the user to select RBFs in the scene, and copy or move them elsewhere. The user simply draws a rectangle on the screen to select RBFs whose center projects inside the rectangle.

Paintbrush—The paintbrush places Gaussians along a stroke drawn by the user. The stroke is projected onto a 3D, user-specified plane. Both the amplitude c and scale α of the Gaussians can be adjusted. The distance between two adjacent Gaussians along the stroke can also be changed (e.g., 0.75/α by default). In one embodiment, the Gaussian centers are moved by a random vector lying in the plane perpendicular to the stroke. The length of the offset vector may be less than 1/α.

Eraser—The eraser tool reduces the density of those Gaussians it covers. Once a Gaussian's density reaches zero, it is deleted. The radius of the eraser can be adjusted.

Particle Emitter—This feature allows the user to place an emitter at any point in the scene, which then spawns particles. The particle's trajectory is a simple, constant-acceleration (parabolic) path. The spawning rate, acceleration, initial velocity, color, and lifetime of the particles can be adjusted. Gaussians are placed at the centers of the particles. The scale and amplitude of a Gaussian are determined by the particle's lifetime: the longer the particle lives, the smaller its scale and amplitude.

Airbrush—The airbrush is similar to the particle emitter, except that its particles have infinite lifetime and bounce off surfaces in the scene. The particles eventually diffuse out randomly, but confined within open regions of the scene bounded by surfaces. When the airbrush is stopped, all of its particles are frozen. Users can employ this tool to generate a foggy area, or fill a 3D model with particles to create a foggy version of the same shape.

Exemplary Results

The above-described algorithms have been implemented on a 3.7 Ghz PC with 2 GB of memory and an NVidia 8800GTX graphics card.

TABLE 1 summarizes statistics for the various examples. Image generation was done at 800×600 resolution.

TABLE 1

Statistics for the Various Examples

| Scene | # Vertices | # Gaussians | # Lights | FPS |
| --- | --- | --- | --- | --- |
| gargoyle | 78,054 | 34 | 3 | 101 |
| box | 8,901 | 3008 | 1 | 34 |
| terrain | 65,047 | 292 | env. map | 92 |
| city | 77,226 | 353 | env. map | 162 |
| motorcycle | 44,430 | 1223 | env. map | 31 |

Figure 8:
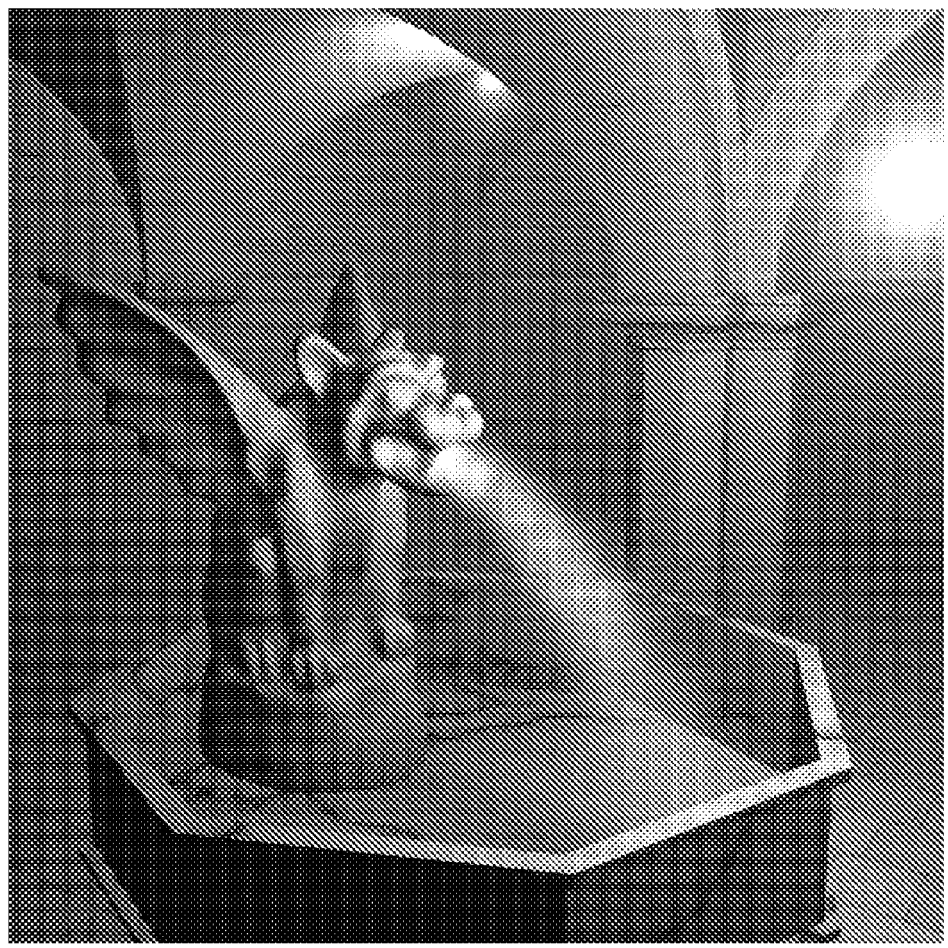
FIG. 8 shows an exemplary rendering of dynamic smoke generated by the particle emitter.

FIG. 8 shows an exemplary rendering of dynamic smoke generated by the particle emitter.

Other examples (not shown) are generated using the algorithms described herein and the accompanying tools such as airbrush and noise addition. In some examples, off-line simulation may be imported to apply the present rendering algorithm. The user is able to visualize simulation results in real time, including interactive lighting and camera change. These examples demonstrate how inhomogeneous media enhances realism. The algorithm is able to obtain several realistic effects, including soft shadows, glowing of the environmental lighting, and softening of highlights and surface reflectance, all in real time. Combined with precomputed radiance transfer (PRT), the present approach provides an attractive solution for rendering dynamic, inhomogeneous media in applications like 3D games.

CONCLUSION

Representing complex spatial variation in scattering media is critical for realistic smoke and fog. Described herein is a novel analytic approach capable of rendering such media in real-time. The algorithm has a potential to significantly speed up the rendering and at the same time is capable to capture many scattering effects, including glows around light sources and shadowing of the media onto itself, as well as softening of shading and shadows on surfaces immersed within the media. Some exemplary results accurately match a full scattering simulation for smooth media, and are consistent and plausible in all cases tested.

Several aspects of the present algorithm contribute to making the rendering fast enough for real-time rendering while preserving visual accuracy. One exemplary approximation assumes that variation of the scattering integrand along the view ray is primarily due to variation in the medium density. This leads the algorithm to separate contributions from each Gaussian by modeling a light path through its nearest point along the view ray while modeling the attenuation and shadowing effect of all other Gaussians using a light path independent of the view ray. The algorithm also averages optical depth in the direction to point light sources or in all directions around a receiver point for environmental sources. This makes it possible to apply constant-fog models of surface reflectance to inhomogeneous media. The rendering method enables new, realistic content for real-time applications like 3D games, and also supports interactive preview and design of scattering media.

It is appreciated that the potential benefits and advantages discussed herein are not to be construed as a limitation or restriction to the scope of the appended claims.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method for rendering an inhomogeneous scattering medium, wherein the inhomogeneous scattering medium is illuminated by a light source and has a density field which can be at least approximately represented by a weighted sum of a set of radial basis functions (RBFs) each having a RBF center, the method comprising:

under control of one or more processors configured with executable instructions, (a) for each RBF, computing an airlight contribution to a pixel corresponding to a viewpoint v and a view ray $\hat{r}$ projecting to a screen space, the airlight contribution being a function of optical depth between the viewpoint v and the respective RBF center, optical depth between the light source and the respective RBF center, and optical depth between the viewpoint v and a first surface point p intersecting the view ray r̂ casting from the viewpoint v;

(b) for each RBF, accumulating airlight contribution toward a total airlight of the pixel; and (c) rendering an image of the inhomogeneous scattering medium at least partially based on the total airlight of each pixel.

2. The method as recited in claim 1, wherein the RBFs are Gaussians.

3. The method as recited in claim 1, wherein for each RBF, steps (a) and (b) are performed for each pixel of a subset of the plurality of pixels, the subset being chosen according to the characteristics of the respective RBF.

4. The method as recited in claim 1, wherein for each RBF the method further comprises:

selecting a threshold defining a bounding sphere for the RBF and projecting the bounding sphere along of a view frustum to form a 2-D bounding shape rasterized into a subset of a plurality of pixels in a screen display space; and performing steps (a) and (b) for each pixel of the subset of the plurality of pixels.

5. The method as recited in claim 1, wherein for each RBF, computing the airlight contribution for each pixel comprises:

computing the value of a function $f(b_i^r)T_i(v,p)$, wherein $T_i(v,p)$ is an optical depth between the viewpoint v and the surface point p, and $f(b_i^r)$ is the value of a contributory scattering function $f(x)$ at a mean value point $b_i^r$ on the view ray, and wherein $f(b^{ir})$ is contributed by optical depth integration along a first light path and optical depth integration along a second light path, the first light path extending from the viewpoint to the light source through the mean value point $b_i^r$, and the second light path extending from the viewpoint to the light source through center $b_i$ of the RBF.

6. The method as recited in claim 5, wherein $f(b_i^r)$ is approximated by $f(b_i^r) \approx f^0(b_i^r) f^1(b_i)$, wherein
$f^0(b_i^r) \propto \exp(-T_i(s,b_i^r)-T_i(v,b_i^r)+T_i(s, b_i)+T_i(v, b_i))$, and
$f^1(b_i)=\exp(-T(s,b_i)-T(v,b_i))$,
where $T_i(s, b^{ir})$ is optical depth between the light source and the mean value point $b_i^r$ of the RBF, and $T_i(v,b_i^r)$ is optical depth between the viewpoint v and the mean value point $b_i^r$ of the RBF, $T(s,b_i)$ is the optical depth between the light source s and the center $b_i$ of the RBF, and $T(v,b_i)$ is optical depth between the viewpoint v and the center $b_i$ of the RBF.

7. The method as recited in claim 5, wherein the mean value point $b_i^r$ is the projection of the RBF center to the view ray.

8. The method as recited in claim 1, wherein the inhomogeneous density field is at least approximately representing by $$\beta(x) = \sum_{i=1}^{n} \beta_i(x) + \beta_0,$$

where $\beta_i(x)$ are RBFs and $\beta_0$ is a constant representing a homogeneous density, the method further comprising:

if $\beta_0$ is non-zero, computing a homogeneous term of the airlight $$L_0 = \beta_0 \int_v^p f(x)dx,$$

wherein $f(x) = k(\alpha(x)) \frac{I_0}{d^2(x)} \exp(-T(v, x) - T(x, s))$, where $k(\alpha(x))$ is a scattering phase function of scattering angle $\alpha$, and $d(x)$ is distance between the light source s and point x; and adding the homogeneous term $L_0$ to the total airlight $L_a$.

9. The method as recited in claim 8, wherein $f(x)$ is approximated as:

$$f(x) \approx \frac{1}{4\pi} \frac{I_0}{d^2(x)} \exp(-\beta_0(\|v - x\| + \|s - x\|))$$
$$\exp(-T(s, v) + \beta_0\|s - v\|)$$
$$= C_{sv} \frac{1}{4\pi} \frac{I_0}{d^2(x)} \exp(-\beta_0(\|v - x\| + \|s - x\|))$$

where $I_0$ is light source intensity, and $C_{sv}=\exp(-T(s,v)+\beta_0\|s-v\|)$, such that integration $$L_0 = \beta_0 \int_v^p f(x)dx$$

can oe solved analytically.

10. The method as recited in claim 1, wherein the inhomogeneous scattering medium is illuminated by an environment light $L^{in}$ in the addition to the light source s, the method further comprising:

for each pixel covered by the environment light $L^{in}$, computing an environmental airlight; and adding the environmental airlight to the total airlight $L_a$ of the pixel.

11. The method as recited in claim 10, wherein computing the environmental airlight comprises computing the value of $(L^{in} * NPSF)(\hat{r})T\exp(-T)$, where T is average optical depth around the viewpoint, NPSF is a point spread spherical function depending only on scattering phase function but independent of the scattering medium.

12. The method as recited in claim 1, further comprising:

computing an exitant radiance $L_p$ contributed by surface reflectance of the light source s at the surface point p;

computing an attenuated radiance arriving at the viewpoint v based on the exitant radiance $L_p$; and adding the attenuated radiance to the total airlight $L_a$ to obtain a total radiance L arriving at the viewpoint v along the view ray, wherein the rendering of the image is based on the total radiance L.

13. The method as recited in claim 12, wherein the exitant radiance $L_p$ is computed as a function of a total incident illumination $L_p^{in-tot}$, a visibility $V_p$ of a distant environment at the surface point p and a bidirectional reflectance distribution function (BRDF) $B_{pv}$ assuming p is being viewed from v.

14. The method as recited in claim 12, wherein the light source s comprises a point lighting, the exitant radiance $L_p$ is computed as a function of a total incident illumination $L_p^{in-tot}$, a visibility $V_p$ of a distant environment at the surface point p and a bidirectional reflectance distribution function (BRDF) $B_{pv}$ assuming p is being viewed from v, the method further comprising:

determining the total incident illumination $L_p^{in-tot}$ according to the approximation $$L_p^{in-tot} = \frac{I_0 e^{-T(s,p)}}{d_{ps}^2}(T(s,p)\delta_{ps} * NPSF + \delta_{ps}),$$

where $\delta_{ps}$ is a delta function in the direction from p to s characterizing the point lighting, $I_0$ is the intensity of the point lighting, T(s,p) is optical depth between the point lighting and the surface point p, $d_{sp}$ is distance between the point lighting and the surface point p, and NPSF is a point spread spherical function depending only on scattering phase function but independent of the scattering medium.

15. The method as recited in claim 1, wherein the inhomogeneous scattering medium is illuminated by an environment light in addition to the light source s, the method further comprising:
    computing an average optical depth T(p) in all directions around the surface point p;
    computing an exitant environment radiance contributed by surface reflectance of the environment light at the surface point p based on the average optical depth T(p);
    computing an attenuated environment radiance arriving at the viewpoint v based on the exitant environment radiance; and
    adding the attenuated environment radiance to the total airlight $L_a$ to obtain a total radiance L arriving at the viewpoint v along the view ray, wherein the rendering of the image is based on the total radiance L.

16. A method for rendering an inhomogeneous scattering medium, the method comprising:
    (a) receiving an input describing a density field of the inhomogeneous scattering medium illuminated by a light source, the density field being at least approximately represented by a weighted sum of a set of radial basis functions (RBFs) each having a RBF center;
    (b) for each RBF,
        selecting a subset of a plurality of pixels in a screen display space,
        computing an airlight contribution to each pixel of the subset of the plurality of pixels, the airlight contribution being a function of optical depth between a viewpoint v and the respective RBF center, optical depth between the light source and the respective RBF center, and optical depth between the viewpoint v and a first surface point p intersecting a corresponding view ray r̂ casting from the viewpoint v, and
        accumulating airlight contribution toward a total airlight of each pixel; and
    (c) rendering an image of the inhomogeneous scattering medium at least partially based on the total airlight of each pixel.

17. The method as recited in claim 16, wherein the subset of the plurality of pixels are determined by:
    selecting a threshold defining a bounding sphere for the RBF; and
    projecting the bounding sphere along of a view frustum to form a 2-D bounding box rasterized into the subset of a plurality of pixels in a screen display space.

18. The method as recited in claim 16, further comprising:
    computing an exitant radiance at the surface point p as a function of a total incident illumination, a visibility of a distant environment at the surface point p and a bidirectional reflectance distribution function (BRDF) assuming p is being viewed from v;
    computing an attenuated radiance arriving at the viewpoint v based on the exitant radiance; and
    computing a total radiance arriving at the viewpoint v along the view ray based on the attenuated radiance and the total airlight, wherein the rendering an image of the inhomogeneous scattering medium is based on the total radiance.

19. A method comprising:
    under control of one or more processors configured with executable instructions,
    computing for each radial basis function (RBF) each having a RBF center, an airlight contribution to a pixel corresponding to a viewpoint and a view ray projecting to a screen space, the airlight contribution being a function of optical depth between a viewpoint v and the respective RBF center, optical depth between the light source and the respective RBF center, and optical depth between the viewpoint v and a first surface point p intersecting a view ray r̂ casting from the viewpoint v;
    computing for each RBF, airlight contribution toward a total airlight of the pixel;
    rendering an image of an inhomogeneous scattering medium illuminated by a light source, at least partially based on the total airlight of each pixel;
    receiving a user input which comprises a modification or update of a property of an inhomogeneous scattering medium, the property being any one or a combination of density, optical property and lighting; and
    rendering in real time a stream of images of the modified or updated inhomogeneous scattering medium.

* * * * *

UNITED STATES PATENT AND TRADEMARK OFFICE
CERTIFICATE OF CORRECTION

PATENT NO. : 7,940,268 B2
APPLICATION NO. : 11/770942
DATED : May 10, 2011
INVENTOR(S) : Kun Zhou et al.

It is certified that error appears in the above-identified patent and that said Letters Patent is hereby corrected as shown below:

Title page, item (57), under "Abstract" column 2, line 1, after "rendering" insert -- of --.

In column 21, line 31, in Claim 5, delete " $f(b^{ir})$ " and insert -- $f(b_i^r)$ --, therefor.

In column 21, line 40, in Claim 6, delete " $(-T_i(s,b_i^{r})-T_i(v,b_i^{r})+T_i(s, b_i)+T_i(v, b_i))$ " and insert -- $(-T_i(s,b_i^r) - T_i(v,b_i^r) + T_i(s,b_i) + T_i(v,b_i))$, -- therefor.

In column 21, line 42, in Claim 6, delete " $T_i(s,b^{ir})$ " and insert -- $T_i(s,b_i^r)$ --, therefor.

In column 21, line 62, in Claim 8, delete "representing" and insert -- represented --, therefor.

In column 22, line 31, in Claim 9, delete "oe" and insert -- be --, therefor.

In column 22, line 58, in Claim 13, delete " $L_p^{in\text{-}tot},a$ " and insert -- $L_p^{in\text{-}tot}, a$ --, therefor.

Signed and Sealed this
Twelfth Day of July, 2011

David J. Kappos
*Director of the United States Patent and Trademark Office*